United States Patent [19]

Dziark

[11] Patent Number: 5,354,833
[45] Date of Patent: Oct. 11, 1994

[54] SHELF-STABLE ONE-PART ROOM TEMPERATURE VULCANIZING FLUOROSILICONE COMPOSITIONS

[76] Inventor: John J. Dziark, 26 Wood Mint Pl., Ballston Spa, N.Y. 12020

[21] Appl. No.: 990,214

[22] Filed: Dec. 14, 1992

[51] Int. Cl.$^5$ .............. C08G 77/24; C08G 77/06; C08K 3/22; C08K 3/34
[52] U.S. Cl. .................. 528/36; 528/15; 528/18; 528/901; 524/431; 524/492; 524/588; 524/731; 524/790
[58] Field of Search ........... 524/431, 492, 588, 731, 524/790, 863; 528/18, 33, 34, 901, 36, 15

[56] References Cited

U.S. PATENT DOCUMENTS

| | | | |
|---|---|---|---|
| 2,938,009 | 5/1960 | Lucas | 523/212 |
| 3,635,743 | 1/1972 | Smith | 106/490 |
| 4,257,932 | 3/1981 | Beers | 528/901 |
| 4,395,507 | 7/1983 | Dziark et al. | 528/18 |
| 4,514,529 | 4/1985 | Beers et al. | 524/731 |
| 4,528,324 | 7/1985 | Chung et al. | 528/901 |
| 4,737,561 | 4/1988 | Stary et al. | 528/901 |
| 4,892,907 | 1/1990 | Lampe et al. | 524/731 |
| 5,236,997 | 8/1993 | Fujiki | 524/863 |

*Primary Examiner*—Paul R. Michl
*Assistant Examiner*—Tae H. Yoon

[57] ABSTRACT

A method for continuously producing a room temperature vulcanizable composition is disclosed. A base mixture of a silanol stopped fluorosilicone polymer, a silica filler and iron oxide are processed in an extruder at an elevated temperature between about 50 and 200° C. Thereafter, a tin based catalyst, an acetoxy cross-linking agent and an optional adhesion promoter are added to the extruder near the exit port. The resulting material has improved storage stability.

4 Claims, No Drawings

SHELF-STABLE ONE-PART ROOM TEMPERATURE VULCANIZING FLUOROSILICONE COMPOSITIONS

BACKGROUND OF THE INVENTION

The present invention relates to one-part room temperature vulcanizing (RTV) rubber sealant compositions. More particularly, the invention relates to RTV fluorosilicone rubber sealant compositions being continuously processed in an extruder at high temperatures and having improved storage stability.

RTV fluorosilicone rubber sealant compositions are known in the art. Such compositions are known for their ability to resist change at elevated temperatures and exposure to adverse conditions over extended periods of time. In general, materials are needed which have the outstanding properties such as good tensile strength and also retain such properties after prolonged storage prior to cure.

Efforts have been made in the past to produce RTV silicone elastomer compositions having increased strength and adhesion.

Exemplary RTV elastomers are disclosed in U.S. Pat. No. 4,514,529 to Beers et al. and Lucas et al., U.S. Pat. No. 4,523,353.

Although one-part RTV compositions having reasonably good tensile physical properties are known in the art, it is desirable to produce on a continuous basis, as opposed to batch process, RTV compositions having good physical properties and cure characteristics after prolonged storage.

SUMMARY OF THE INVENTION

The present invention is based upon the discovery that a base polymer comprising a blend of a silanol stopped fluorosilicone polymer, a treated silica filler, and iron oxide may be continuously processed in an extruder at an elevated temperature followed by the addition of an acetoxy crosslinker, a tin based catalyst and an optional adhesion promoter further down the extruder to produce an RTV sealant having good room temperature adhesion and tensile strength and retainable cure properties after prolonged storage.

In a particular embodiment, the invention comprises (A) a base composition including (A1) 100 parts by weight of a silanol stopped fluorosilicone polymer such as poly(methyltrifluoropropyl) siloxane having a viscosity ranging from about 600 to about 300,000 cps at 25° C.; (A2) from about 3 to about 25 parts by weight based upon (A1) of a treated silica filler; (A3) up to about 200 parts by weight based upon (A1) of finely divided Fe$_2$O$_3$ having a particle size ranging from about 0.05 to about 5 microns. In addition, the RTV composition also includes (B) a catalyst solution comprising (B1) up to about 0.5 parts by weight based upon (A) of a tin based catalyst; (B2) from about 2 to about 15 parts by weight based upon (A) of an acetoxy cross-linking agent comprising (a) a methyltriacetoxy silane or (b) ethyltriacetoxysilane or mixtures of (a) and (b); and (B3) from about 0.1 to about 4 parts by weight based upon (A) of diacetoxydibutoxysilane adhesion promoter. The base composition is continuously processable at an elevated temperature ranging from about 50, preferably from about 100° C. to about 200° C. and the catalyst solution (B) is added at near room temperature after processing (A).

The RTV compositions of the invention cure well and importantly retain curable properties after prolonged storage in the uncured state.

DETAILED DESCRIPTION OF THE INVENTION

The present invention is directed to an RTV curable fluorosilicone sealant composition which may be produced on a continuous basis and which has good cured properties after prolonged storage in the uncured state. The composition comprises (A) a base composition formed of (A1) a fluorosilicone polymer; (A2) a silica filler; and (A3) Fe$_2$O$_3$. The base composition (A) is combined with (B) a catalyst solution including (B1) a tin based catalyst; (B2) an acetoxy cross-linking agent; and (B3) an optional adhesion promoter.

In accordance with the invention, (A1) is a silanol terminated fluorosilicone having a viscosity ranging from about 600 to about 300,000, preferably from about 2,000 to 200,000 and more preferably from about 3,000 to about 150,000 cps at 25° C. In the examples below, (A1) is a silanol stopped poly(methyltrifluoropropyl) siloxane having the formula:

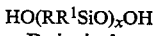

where R is independently selected from monovalent hydrocarbon radicals, free of aliphatic unsaturation containing from 1 to about 8 carbon atoms, R$^1$ is independently selected from fluorinated monovalent hydrocarbon radicals free of aliphatic unsaturation containing from 1 to about 8 carbon atoms and x varies so that (A1) has a viscosity ranging from about 600 to about 300,000 cps at 25° C. In the examples below, x is selected so that (A1) has a viscosity of about 15,000 cps at 25° C.

(A2) comprises from about 3 to about 25, preferably from about 3 to about 20 and more preferably from about 5 to about 15 parts by weight based upon (A1) of a reinforcing filler such as fumed silica (SiO$_2$). The filler preferably has a surface area of between 100 and 300 m$^2$/gm, more preferably, the surface area is about 200 m$^2$/gm in the untreated state. The filler may be treated with various agents so as to prevent the composition from structuring, for example, cyclopolysiloxanes as disclosed in U.S. Pat. No. 2,938,009 to Lucas and silazanes as disclosed in U.S. Pat. No. 3,635,743 to Smith, or both. The cyclopolysiloxanes may be, for example, octamethylcyclotetrasiloxane, present in an amount ranging from about 15 to about 20 weight percent of the filler. In the examples below, (A2) is a trimethylsilyl treated fumed silica having a surface area in the untreated state of about 200 m$^2$/gm.

(A3) is a finely divided Fe$_2$O$_3$ iron oxide powder having an average particle size ranging from about 0.05 to about 5 microns. (A3) is present in an amount up to 200 parts, preferably up to about 60 parts and more preferably 30 parts by weight based upon 100 parts of (A1).

In the examples below, (A3) is a commercially available product sold by Pfizer under the trade designation R2200 having an average particle size of about 0.25 microns.

(B1) is a tin based catalyst which may be present in an amount up to about 0.50 parts by weight based upon 100 parts of the base composition (A).

Preferably, the catalyst is present in an amount from about 0.01 to about 0.4 parts by weight based upon (A), and more preferably (B1) is present in an amount ranging from about 0.05 to about 0.30 parts based upon (A).

In the examples below, (B1)(a) is dibutyltindilaurate and (B1)(b) is dibutyltindiacetate.

(B2) is an acetoxy silane cross-linking agent. Preferably, (B2) comprises (a) methyltriacetoxy silane or (b) ethyltriacetoxysilane or mixtures of (a) and (b). The cross-linking agent is present in an amount from about 2 to about 15 parts by weight based upon 100 parts of the base composition (A), preferably from 2 to about 10 parts by weight based upon (A), and more preferably from about 3 to about 7 parts by weight based upon (A).

(B3) is an optional adhesion promoter which may be present in an amount from about 0.1 to about 4 parts by weight based upon 100 parts of the base composition (A), preferably from about 0.2 to about 2 parts by weight based upon (A) and more preferably ranging from about 0.3 to about 1.5 parts by weight based upon (A). (B3) may, for example, be diacetoxydibutoxysilane.

The following examples demonstrate the effect of the present invention. Examples 1 and 2 set forth the preparation and testing of sealants in which the base polymer (A) is prepared by combining Components (A1), (A2) and (A3) in a first supply port of an extruder. In Examples 1 and 3, (A1), (A2) and (A3) are continuously processed at a low temperature. In Examples 2 and 4, (A1), (A2) and (A3) are continuously processed at a high temperature. Components (B1), (B2) and (B3) are added at a supply port between the first supply port and the extruder exit port.

EXAMPLE 1

An extruder was set up to cosine the following ingredients in the following proportions:
(A) base composition:
- (A1) 100 parts—silanol stopped fluorosilicone polymer (approximately 150,000 cps at 25° C.) poly(methyltrifluoropropyl) siloxane;
- (A2) 9 parts by weight based upon (A1)—trimethyl silyl treated fumed silica, 200 m²/gm in the untreated state;
- (A3) 30 parts by weight based upon (A1)—$Fe_2O_3$.

The above materials were added to the extruder to constitute the base composition and were continuously processed at 50° C. for about 1 min. Thereafter, 5.79 parts by weight based upon the sum of (A1), (A2) and (A3) of a catalyst solution (B) was added to the end of the extruder:
(B) Catalyst solution:
- (B1)(b) dibutyltindiacetate—1.2 parts;
- (B2)(a) methyltriacetoxy silane—80 parts;
- (B3) diacetoxydibutoxy silane—20 parts;

Shortly after manufacture, the material was tested for physical properties after curing 7 days at 75° C. at 50% relative humidity. The results are listed on Table 1-A.

TABLE 1A

|  | Initial |
| --- | --- |
| Shore A | 32 |
| Tensile Strength (psi) | 526 |
| Elongation % | 312 |
| Mod. at 50% ext. (psi) | 64 |

Samples of the uncured sealant were stored at room temperature for one year and tested in a similar fashion. The results are listed in Table 1B.

TABLE 1B

|  | Initial |
| --- | --- |
| Shore A | 10 |
| Tensile Strength (psi) | 124 |
| Elongation % | 365 |
| Mod at 50% ext. (psi) | 23 |

After storage, the sealant cured to an elastomer which was 22 Shore A points lower and retained only about 24% of its initial tensile strength.

Example 2

The materials were combined as set forth in Example 1 except that processing temperature of the base polymer (A) was maintained at 100° C. Initial properties and resulting properties after one year are set forth in Tables 2A and 2B, respectively.

TABLE 2A

|  | Initial |
| --- | --- |
| Shore A | 34 |
| Tensile Strength (psi) | 533 |
| Elongation % | 333 |
| Mod at 50% ext. (psi) | 68 |

TABLE 2B

|  | Initial |
| --- | --- |
| Shore A | 22 |
| Tensile Strength (psi) | 428 |
| Elongation % | 438 |
| Mod at 50% ext. (psi) | 40 |

After one year in storage, the material cured to an elastomer which was only 12 Shore A points lower and which retained approximately 80% of its initial tensile strength, demonstrating improved shelf life at elevated processing temperatures.

EXAMPLE 3

An extruder was set up to combine the following ingredients in the following proportions:

| (A1) | 100 parts |
| --- | --- |
| (A2) | 9 parts |
| (A3) | 30 parts |

The above materials were added to the first section of the extruder and processed at 50° C. to constitute the base portion of the RTV sealant.

The catalyst solution (B) (5.79 parts per 100 parts of base (A)) was added to the later section of the extruder as described in Example 1.

| Catalyst solution (B): | |
| --- | --- |
| (B1)(a) dibutyltindilaurate | 0.6 parts |
| (B2)(a) methyltriacetoxysilane | 80 parts |
| (B3) diacetoxydibutoxysilane | 30 parts |

The sealant was tested as set forth in Example 1 for initial properties and properties after one year storage in the uncured state. The initial properties are set forth in Table 3A and the properties after storage in the uncured state after one year are set forth in Table 3B.

TABLE 3A

|  | Initial |
| --- | --- |
| Shore A | 32 |
| Tensile Strength (psi) | 583 |
| Elongation % | 332 |
| Mod at 50% ext. (psi) | 66 |

TABLE 3B

|  | Initial |
| --- | --- |
| Shore A | 19 |
| Tensile Strength (psi) | 360 |
| Elongation % | 431 |
| Mod at 50% ext. (psi) | 32 |

After storage, the sealant cured to an elastomer which was 13 Shore A points lower and retained only 62% of the initial tensile strength.

EXAMPLE 4

The materials were combined as in Example 3 except that the basic polymer (A) was processed at 100° C. Initial properties and properties after one year are set forth below in Tables 4A and 4B, respectively.

TABLE 4A

|  | Initial |
| --- | --- |
| Shore A | 33 |
| Tensile Strength (psi) | 514 |
| Elongation % | 320 |
| Mod at 50% ext. (psi) | 71 |

TABLE 4B

|  | Initial |
| --- | --- |
| Shore A | 27 |
| Tensile Strength (psi) | 583 |
| Elongation % | 450 |
| Mod at 50% ext. (psi) | 50 |

The examples demonstrate that continuously produced fluorosilicone RTV sealants, when processed at elevated temperatures, exhibit improved storage stability.

While there has been described what at present are considered to be the preferred embodiments of the present invention, it will be readily apparent to those skilled in the art that various changes may be made therein without departing from the invention and it is intended in the appended claims to cover such changes and modifications as fall within the true spirit and scope of the invention.

What is claimed:

1. A shelf stable room temperature vulcanizable composition having been continuously produced in an extruder having an exit port, a first supply port upstream of said exit port, and a second supply port at a location along said extruder between said first supply port and said exit port, said composition comprising:

a fluorosilicone polymer, a silica filler and a ferrous oxide which are supplied to said extruder at said first supply port and which are processed at a temperature ranging from about 100 to about 200° C. to form a base composition; and a catalyst solution including a tin based catalyst and an acetoxy silane cross linking agent added to the base composition in the extruder at said second supply port between the first supply port and the exit port.

2. A room temperature vulcanizable composition as in claim 1, wherein said fluorosilicone polymer comprises:

(A1) 100 parts by weight of a silanol terminated fluoro polymer having the formula $OH(RR^1SiO)_xOH$, wherein each R is a monovalent hydrocarbon radical free of aliphatic unsaturation containing from about 1 to about 8 carbon atoms, each $R^1$ is a fluorinated monovalent hydrocarbon free of aliphatic unsaturation containing from 1 to about 8 carbon atoms and x varies so that (A1) has a viscosity of about 600 to about 300,000 cps at 25° C.;

said silica filler comprises:

(A2) from about 3 to about 25 parts by weight based upon (A1) of a treated silica filler having a surface area of about 100 to 300 $m^2/gm$ in an untreated state;

said cross-linking agent comprises:

(B3) from about 2 to about 15 parts by weight based upon 100 parts of the sum of (A1) and (A2) of at least one acetoxy cross-linking agent selected from the group consisting of methyltriacetoxy silane and ethyltriacetoxysilane; and said tin based catalyst is present in an amount up to about 0.5 parts by weight based upon 100 parts of the stun of (A1) and (A2).

3. A room temperature vulcanizable composition as in claim 1, further comprising (A3) finely divided $Fe_2O_3$ having an average particle size ranging from about 0.05 to about 5 microns.

4. A room temperature vulcanizable composition as in claim 1, further comprising up to about 4 parts by weight based upon (A1) of an adhesive promoter.

* * * * *